United States Patent Office 2,880,586
Patented Apr. 7, 1959

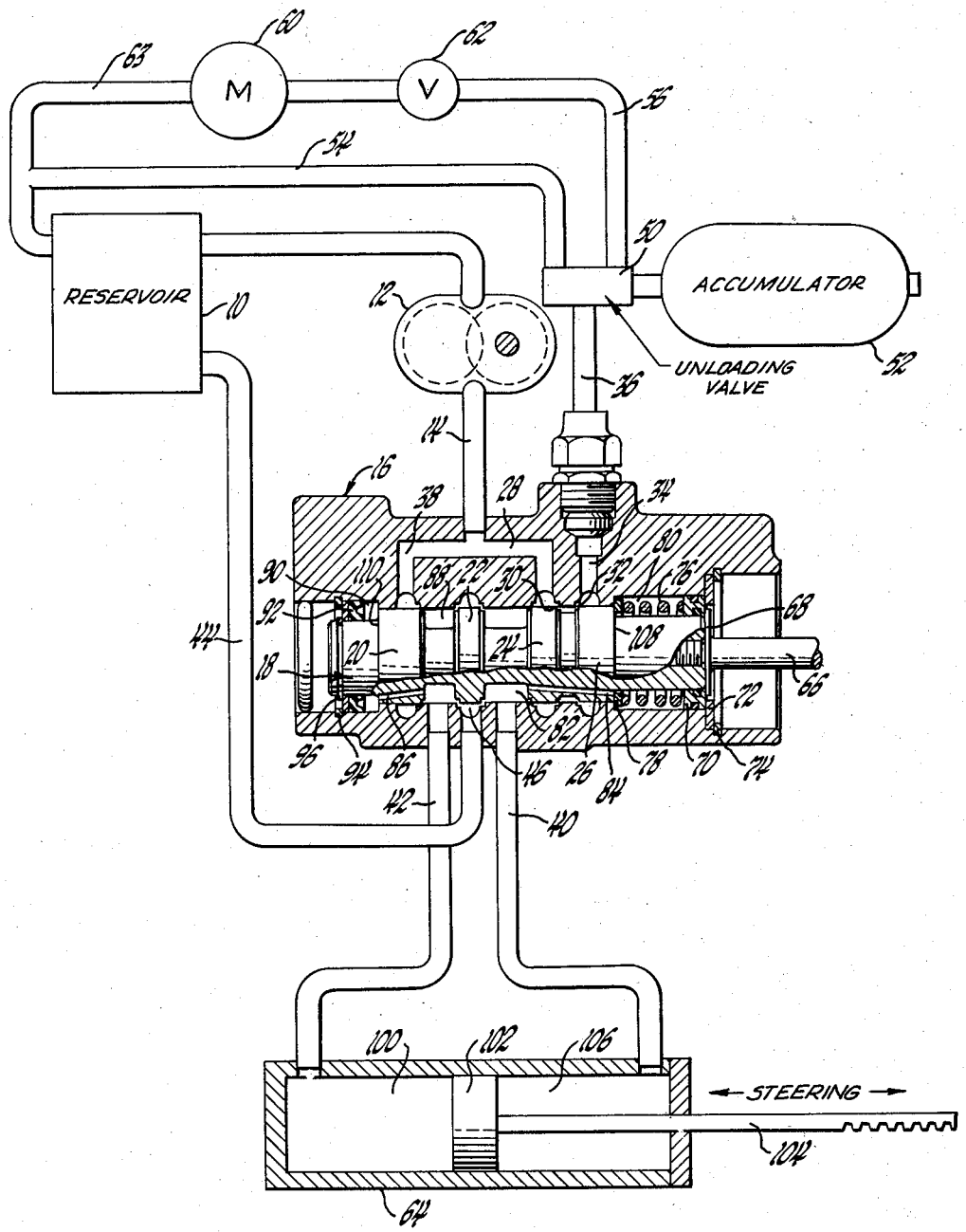

2,880,586

FLUID SYSTEM WITH PRIORITY VALVE

Clovis W. Lincoln, Saginaw, Mich., assignor to General Motors Corporation, Detroit, Mich., a corporation of Delaware Application October 25, 1955, Serial No. 542,645

1 Claim. (Cl. 60—97)

This invention is addressed to a fluid circuit including an accumulator serving one or more fluid motors or jacks and further including a control valve functional with respect to another fluid motor and operating to insure a supply of pressure fluid to the latter motor at all times. The invention in practical application has particular relation to an automotive vehicle equipped with various fluid-actuated accessories, including a fluid-actuated power steering gear.

Because of the critical nature of the steering function, it is believed important in the case of such a vehicle that the fluid system be so designed as to preclude a situation where inadequate pressure is available for steering. Now, should the steering mechanism as well as all of the other accessories depend for fluid pressure on the accumulator, the demand thereon could become so excessive under certain conditions of operation as to substantially or completely deprive the operator of the vehicle of any power assist in steering. While it is true that most fluid power steering gears are designed to allow for manual steering in the event of a failure in the fluid system, a sudden lessening or cessation of the power assist is considered undesirable as likely to cause apprehension on the part of the operator, leading to a possible mishap.

As indicated, the principal object of the present invention is to provide a central fluid system including means whereby a component of the system is given priority at all times with respect to the fluid pressure available.

Other objects and features of the invention will be apparent from the following detailed description which will proceed with reference to the accompanying essentially diagrammatic drawing.

In the drawing, the numeral 10 indicates a reservoir for the particular fluid, normally a mineral oil of suitable viscosity and other characteristics. A pump 12, which in application of the system to an automotive vehicle may be belted to the crankshaft, draws from the reservoir and discharges through the pipe 14 to a control valve 16 comprising a spool 18 having lands 20, 22, 24, and 26.

With the spool 18 in its neutral position as shown (corresponding to the straight-ahead position of the dirigible wheels of the vehicle) pressure fluid entering the passageway 28 flows past the annular valving edges 30, 32 to enter a passageway 34 communicating with external line 36, while fluid entering the passageway 38 is prevented from entering the body of the valve by the left-hand end land 20. Cylinder lines 40 and 42, with the spool 18 in neutral position, are open to each other and to return or exhaust line 44, land 22 in its shown position being of insufficient width to close off the annular channel 46.

Line 36 terminates at an unloading valve 50 for an accumulator 52. These parts are commercially available and hence need not be described with any particularity here. Suffice it to say that the valve is so designed that it tends to maintain the accumulator at a selected pressure or range of pressure, say 8000–1,000 p.s.i. Thus, if we assume that the accumulator pressure has fallen to a point demanding the admission of fluid thereinto, the moving element within the valve 50 blocks out exhaust line 54, and the pressure in the accumulator is restored. During the charging cycle, line 56 remains open to the accumulator so as to assure proper operation of accessory motor 60 on manipulation of control valve 62. Exhaust fluid from the motor 60 is returned to the reservoir via line 63 with which the previously mentioned exhaust line 54 connects.

Motor 60 may be considered as actuating the windshield wipers, for example, of the automotive vehicle to which the disclosed system is applied.

Before discussing the relationship of valve 16 and motor or jack 64, representing the means for providing the power assist for the steering gear of the vehicle, some further description of the construction of the valve appears in order. Firstly, it should be observed that the valve is manually actuated from the vehicle steering wheel, not shown, through a shaft 66 flanged at 68 and threaded into the right-hand end of the spool 18. The inner face of the flange 68 abuts the outer face of a seal ring 70 which is additionally abutted by an annular stop 72 backed by a split ring 74 accommodated in a recess in the valve housing. Seal ring 70 is maintained in close contact with the flange 68 and stop 72 by a coil spring 76 which, at its other end, bears against a seat 78.

The chamber 80 in which the parts just mentioned are confined opens to the annular space 82 between the lands 22 and 24 of the valve spool via a passageway 84 extending through the lands 24 and 26. Similarly, lefthand end land 20 is drilled to provide a passageway 86 allowing for intercommunication between the annular space 88 and a chamber 90, which confines a seal 92 back by split rings 94 and 96 accommodated in grooves formed in the valve housing and valve spool, respectively.

To describe now the operation of the system during steering of the vehicle, let it be assumed that it is desired to negotiate a left turn. In such case, the turning of the steering wheel results in displacement of the valve spool 18 to the left so that the land 26 prevents flow of pressure fluid to the accumulator unloading valve 50. Substantially simultaneously, the annular space 88, and hence line 42, becomes open to the branch pressure line 38 resulting in the pressurization of the left-hand chamber 100 of the cylinder 64. As the piston 102, and with it the rack 104, are moved to the right, fluid is exhausted from the chamber 106 via lines 40 and 44, the flow from line 40 to line 44 being through the valve past the land 22, which during a left turn is positioned so as to substantially restrict or block the flow of fluid from the space 88 to the line 44.

The leftward movement of the spool occurs against the resistance of the spring 80, flange 68 operating to carry the seal ring 70 leftward, and also occurs against the resistance of pressure fluid passing from the space 88 through the passageway 86 into the chamber 90. Because the pressure at 90 is the same as that prevailing in the cylinder 64 at 100, the resistance sensed at the steering wheel is proportionate to the actual steering resistance, providing an obvious advantage.

In the negotiation of a right turn, the spool 18 is displaced to the right, again shutting off the flow of pressure fluid to the accumulator (note land 24) and interconnecting branch pressure passageway 28 and cylinder line 40 through the annular space 82 between the lands 22 and 24. As the piston 102 moves to the left, fluid is exhausted from the chamber 100 to the reservoir past land 22 via lines 42 and 44. The extent to which the land 22 restricts flow from the annular chamber 82 to exhaust depends upon the pressure required to overcome the particular resistance to steering encountered in making the turn.

As in the case of the left turn, the manual effort required to displace the spool 18 to the right must be sufficient to overcome the resistance of the spring 76. This resistance is supplemented by pressure fluid entering the chamber 80 via the passageway 84. Such fluid being under the same pressure as the pressure at 106 in the cylinder 64 gives the desired proportionate "feel" at the steering wheel. The annular area 108 against which the fluid reacts is made smaller than the annular area 110 against which the fluid reacts on a left turn, because of the piston rod 104 which reduces the area of the right-hand face of the piston 102 available for reaction and which thus demands a higher pressure at 106 to move the piston than is required at 100 to move the same.

It will be understood that during steering ample pressure for the operation of accessory motor 60 is available from the accumulator 52. As well known in the art, the system may include a plurality of motors served by the accumulator. These additional motors may power such accessory devices as seat adjusters, convertible top jacks, door control mechanisms, etc.

Having thus described and illustrated my invention, what I claim is:

In a fluid system, a pump, a reservoir from which said pump draws, a main motor served by said pump, an auxiliary motor so served, a control valve between said pump and said motor including an axially movable spool element encased within a housing providing a chamber at either end of said spool element, a spring in one of said chambers tending to maintain said spool element in a normal centered position, means for axially displacing said spool element to energize said main motor, an accumulator between said control valve and said auxiliary motor, and an unloading valve through which said accumulator is supplied with fluid, said unloading valve and said auxiliary motor having direct connections to said reservoir, said housing having a pair of annular internal channels connected to said pump, a pair of ports located mediate said pair of channels and connected to said main motor, an annular internal channel between said pair of ports connected to said reservoir and an annular internal channel connected to said unloading valve, said spool element carrying a plurality of lands controlling fluid flow through said channels and ports, the land functional with relation to the channel connected to said unloading valve and one of the lands functional with relation to said first-mentioned channels permitting flow to said unloading valve only when said spool element is in its said normally centered position, said last two lands and the land functional with relation to the other of said first-mentioned channels having passages therein permitting fluid flow from such channels to said chambers, whereby pump pressure is applied as a resistance to displacement of said spool element.

References Cited in the file of this patent

UNITED STATES PATENTS

| | | |
|---|---|---|
| 780,614 | Nash | Jan. 24, 1905 |
| 2,319,486 | Austin | May 18, 1943 |
| 2,331,109 | DeGanahl | Oct. 5, 1943 |
| 2,395,671 | Kleinhans et al. | Feb. 26, 1946 |
| 2,608,263 | Garrison | Aug. 26, 1952 |
| 2,674,092 | Gardiner | Apr. 6, 1954 |
| 2,708,344 | Creer | May 17, 1955 |
| 2,716,946 | Hardy | Sept. 6, 1955 |
| 2,793,498 | Banker | May 28, 1957 |